US012555673B2

(12) United States Patent
Conoci et al.

(10) Patent No.: US 12,555,673 B2
(45) Date of Patent: Feb. 17, 2026

(54) IMAGE CLASSIFICATION METHOD, IN PARTICULAR MEDICAL IMAGES, FOR EXAMPLE RADIOGRAPHIC IMAGES

(71) Applicant: INOVA BIOMEDICAL TECHNOLOGY S.R.L., Catania (IT)

(72) Inventors: Sabrina Conoci, Tremestieri Etnco (IT); Francesco Traina, Ferrara (IT)

(73) Assignee: INOVA BIOMEDICAL TECHNOLOGY S.R.L., Catania (IT)

( * ) Notice: Subject to any disclaimer, the term of this patent is extended or adjusted under 35 U.S.C. 154(b) by 315 days.

(21) Appl. No.: 18/267,315

(22) PCT Filed: Dec. 17, 2021

(86) PCT No.: PCT/IB2021/061941
§ 371 (c)(1),
(2) Date: Jun. 14, 2023

(87) PCT Pub. No.: WO2022/130327
PCT Pub. Date: Jun. 23, 2022

(65) Prior Publication Data
US 2024/0055102 A1 Feb. 15, 2024

(30) Foreign Application Priority Data

Dec. 17, 2020 (IT) .................. 102020000031289

(51) Int. Cl.
*G06V 10/764* (2022.01)
*G06T 5/70* (2024.01)
(Continued)

(52) U.S. Cl.
CPC .............. *G16H 30/40* (2018.01); *G06T 5/70* (2024.01); *G06T 5/92* (2024.01); *G06T 7/0012* (2013.01);
(Continued)

(58) Field of Classification Search
CPC . G06T 2207/10116; G06T 2207/20021; G06T 2207/20076; G06T 2207/20081;
(Continued)

(56) References Cited

U.S. PATENT DOCUMENTS

| 10,932,744 | B2 * | 3/2021 | Castillo | G06T 3/18 |
| 2019/0183444 | A1 * | 6/2019 | Castillo | G06T 7/37 |
| 2020/0161005 | A1 * | 5/2020 | Lyman | G16H 50/20 |

FOREIGN PATENT DOCUMENTS

KR    20190055567    5/2019

OTHER PUBLICATIONS

International Search Report and Written Opinion in corresponding International Patent Application No. PCT/IB2021/061941, mailed Apr. 14, 2022 (17 pages).

(Continued)

*Primary Examiner* — Tsung Yin Tsai
(74) *Attorney, Agent, or Firm* — Leason Ellis LLP

(57) ABSTRACT

An image classification method, in particular medical images, for example radiographic images, wherein a sub-image $R_I$ which contains, for example, a Region Of Interest (ROI) in which a portion of limb and a prosthesis inserted into the same limb are visible is subjected to a classification process designed to define whether the sub-image $R_I$ belongs to a first class C1 of images with a respective first probability P1 or to a second class of images C2 with a respective probability P2.

15 Claims, 3 Drawing Sheets

(51) Int. Cl.
*G06T 5/92* (2024.01)
*G06T 7/00* (2017.01)
*G06T 7/11* (2017.01)
*G06V 10/77* (2022.01)
*G06V 10/774* (2022.01)
*G06V 10/82* (2022.01)
*G06V 20/50* (2022.01)
*G16H 30/40* (2018.01)

(52) U.S. Cl.
CPC .............. *G06T 7/11* (2017.01); *G06V 10/764* (2022.01); *G06V 10/7715* (2022.01); *G06V 10/774* (2022.01); *G06V 10/82* (2022.01); *G06V 20/50* (2022.01); *G06T 2207/10116* (2013.01); *G06T 2207/20021* (2013.01); *G06T 2207/20076* (2013.01); *G06T 2207/20081* (2013.01); *G06T 2207/20084* (2013.01); *G06T 2207/30052* (2013.01); *G06V 2201/03* (2022.01)

(58) Field of Classification Search
CPC . G06T 2207/20084; G06T 2207/30052; G06T 5/70; G06T 5/92; G06T 7/0012; G06T 7/11; G06V 10/25; G06V 10/454; G06V 10/764; G06V 10/7715; G06V 10/774; G06V 10/82; G06V 20/50; G06V 2201/03; G06V 2201/033
See application file for complete search history.

(56) References Cited

OTHER PUBLICATIONS

Arena P et al: "Dynamics of State Controlled CNNS", 1996 IEEE International Symposium on Circuits and Systems (ISCAS) . Circuits and Systems Connecting the World. Atlanta, May 12-15, 1996; [IEEE International Symposium on Circuits and Systems (ISCAS)], New York, IEEE, US, May 12, 1996 (May 12, 1996), pp. 56-59, XP000688846, DOI: 10.1109/ISCAS.1996.541479, ISBN: 978-0-7803-3074-0, Section 1; p. 56, col. 1-col. 2.

Chua L O et al: "Cellular Neural Networks: Theory", IEEE Transactions on Circuits and Systems, IEEE Inc. New York, US, vol. 35, No. 10, Oct. 1, 1988 (Oct. 1, 1988), pp. 1257-1272, XP000098614, DOI: 10.1109/31.7600 p. 1258-p. 1259.

Wang Xiaopeng et al: "Computer Medical Image Segmentation Based on Neural Network", IEEE Access, IEEE, USA, vol. 8, Aug. 9, 2020 (Aug. 9, 2020), pp. 158778-158786, XP011807863, DOI: 10.1109/ACCESS.2020.3015541 the whole document.

Alireza Borjali et al: "Detecting mechanical loosening of total hip replacement implant from plain radiograph using deep convolutional neural network", arxiv.org, Cornell University Library, 201 Olin Library Cornell University Ithaca, NY 14853, Dec. 2, 2019 (Dec. 2, 2019), XP081543454, p. 6, line 8-line 12; figures 1, 2 8,9,11 p. 8, paragraph 17-paragraph 23.

\* cited by examiner

IMAGE CLASSIFICATION METHOD, IN PARTICULAR MEDICAL IMAGES, FOR EXAMPLE RADIOGRAPHIC IMAGES

CROSS-REFERENCE TO RELATED APPLICATIONS

This patent application is a U.S. National Phase Application under 35 U.S.C. § 371 of International Patent Application No. PCT/IB2021/061941, filed on Dec. 17, 2021, which claims priority from Italian patent application no. 102020000031289, filed on Dec. 17, 2020, all of which are incorporated by reference, as if expressly set forth in their respective entireties.

FIELD OF THE INVENTION

The present invention relates to an image classification method, in particular medical images, for example radiographic images.

BACKGROUND OF THE INVENTION

The implantation of medical devices, with particular reference to bone prostheses in patients of any age and gender, requires a careful follow-up stage as in this stage the outer surface of the prosthesis must integrate into the bone structure. In fact, two specific problems that require considerable attention can occur in the follow-up stage:
- aseptic inflammatory processes in the regions surrounding the prosthetic implant; and
- septic inflammatory processes (infections) which must be promptly identified and which require a targeted antiseptic treatment.

If not promptly treated/diagnosed, the above-mentioned processes degenerate progressively causing removal of the prosthesis from the bone, hence, reoperation of the patient. It is therefore necessary to periodically analyse the medical (in particular radiographic) images of the prosthesis to identify any regions of interest of the image indicative of an inflammatory process in progress.

A method for examining medical images, with particular reference to (X-rays) RX images, is proposed which allows these images to be automatically catalogued with respect to a clinical status of infection or inflammation. Cataloguing of these images does not allow a diagnostic therapeutic indication to be directly obtained in relation to the patient, but the subsequent processing of the images is faster. The patent application KR20190055567A relates to a method and a system of classification of medical images with particular reference to RX images which can automatically classify these images so that they can be interpreted directly in a radiography site in a simple and immediate manner. The patent application KR20190055567A provides a method for classifying a medical image with particular reference to radiographic images comprising the steps of: selecting information on an image formation portion as first information; selecting a reading result of the photographed portion as second information; and determining classification information of the radiographic image according to a combination of the first information and the second information. As will be seen below, the method of the present invention can also be applied in fields other than the field of medicine, for example, for examining generic images which contain discontinuities representative of the connection between a part of interest and a surrounding supporting part.

OBJECT OF THE PRESENT INVENTION

The preceding object is achieved by the present invention as it relates to an image classification method, in particular medical images, for example radiographic images, of the type described in claim 1.

DESCRIPTION OF THE PREFERRED EXAMPLE OF EMBODIMENT

Figure 1:
FIG. 1 illustrates a radiographic medical image of a bone prosthesis.

FIG. 1 illustrates a radiographic RX image obtained by means of equipment of a known type of a bone prosthesis applied to the end of a long bone, in this case a femur.

Figure 2:
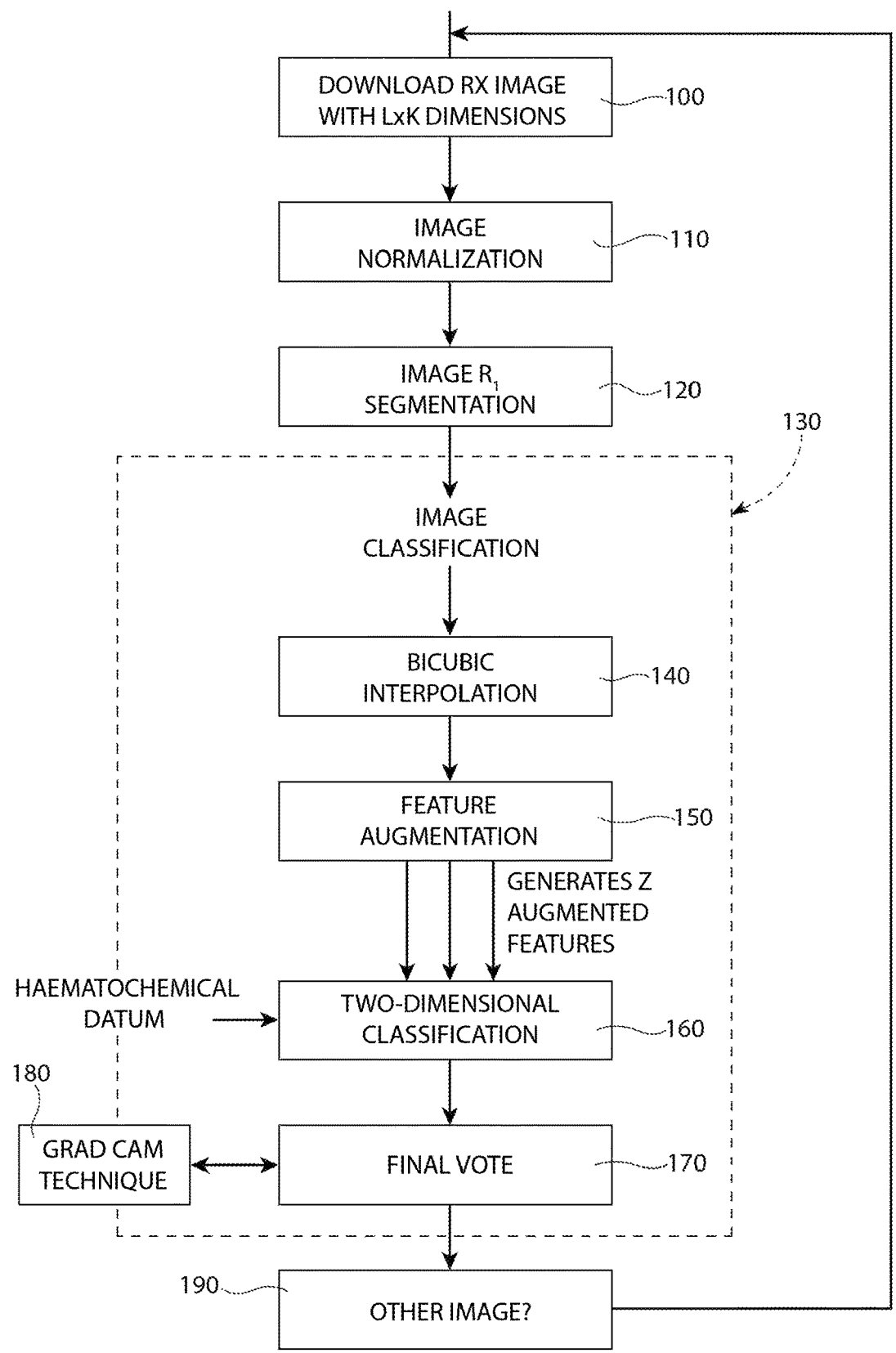
FIG. 2 illustrates, by means of a flow chart, the method of the present invention.

FIG. 2 illustrates the operations of the method of the present invention:

A two-dimensional medical image, in the example, a radiographic RX image of the type shown in FIG. 1 to be subjected to processing (block 100) is downloaded and the image downloaded is subjected to sampling to create a two-dimensional monochrome grayscale image with L×K pixel dimensions. The present method is also designed to operate with medical images of different type, for example, images produced by Computerized Axial Tomography equipment, by magnetic resonance equipment, by ultrasound scanning equipment, etc.

Figure 5:
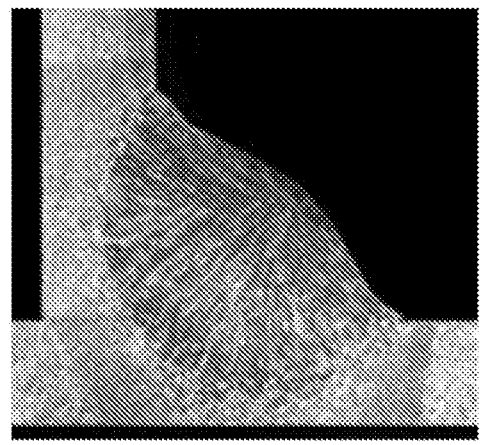
FIG. 5 illustrates an image of an X-ray of a weld.

The image could also be of non-medical type and comprises a generic region of interest in which discontinuities are potentially present. For example, the image could contain the X-ray of a metal part in which a weld is present (region of interest—FIG. 5). For simplicity, the following description will refer to a medical image.

The sampled image is subsequently subjected to normalization and stabilization algorithms (block 110 subsequent to block 100) of a known type, for example, by using filters to eliminate noise, algorithms to improve contrast, algorithms to equalize gray levels, etc.

Figure 3:
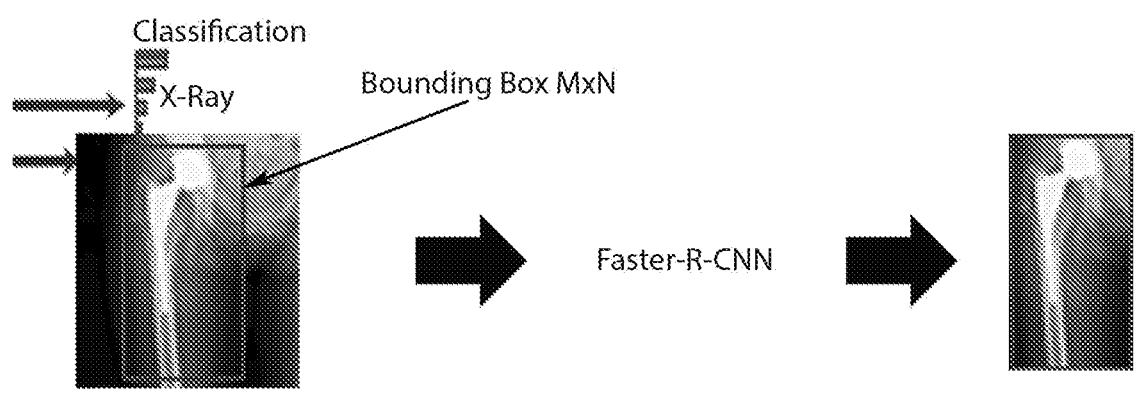
FIG. 3 illustrates a processing operation performed by the method according to the present invention.

Subsequently (block 120 subsequent to block 110) the image is subjected to a segmentation process designed to define, on the entire image having L×K dimensions, a sub-image $R_I$ with M×N pixel dimensions (M<L, N<K) which contains a Region Of Interest (ROI) in which a portion of limb and the prosthesis inserted into the same limb are visible. The sub-image $R_I$ has in the centre the image of the prosthesis (see FIG. 3) or the weld.

Typically, the segmentation process is obtained using the Faster RCNN processing technique (of a known type) which is an object detection architecture presented by Ross Girshick, Shaoqing Ren, Kaiming He and Jian Sun in 2015, which uses convolutional neural networks such as YOLO (You Look Only Once) and SSD (Single Shot Detector). The neural network is trained on previous radiographic images to determine the sub-image $R_I$.

The sub-image $R_I$ is subjected to a classification algorithm (block 130) designed to define whether the sub-image $R_I$ belongs to a first class C1 of images (septic—weld with defects) with a respective first probability P1 or to a second class of images C2 (aseptic—weld without defects) with a respective probability P2. For example, the first class C1 and the second class C2 are mutually exclusive to each other, and the sub-image $R_I$ can only belong to the first class C1 or to the second class C2 (i.e., P1+P2=1).

The classification algorithm operates in the following manner:

the sub-image $R_I$ is subjected to a bicubic type interpolation process (block 140) generating a sub-image with modified scale $R_{I\text{-}B}$ which has $N_2 \times M_1$ pixel dimensions greater than the N×M pixel dimensions of the sub-image $R_I$. As is known in mathematics, bicubic interpolation is an extension of cubic interpolation for interpolating data points on a two-dimensional regular grid. Bicubic interpolation can be performed using Lagrange polynomials, cubic splines or cubic convolution algorithm. The images resampled with bicubic interpolation are smoother and have fewer interpolation artifacts.

The image with modified scale $R_{I\text{-}B}$ is provided to a feature augmentation algorithm (block 150) in which each pixel of the image of $N_2 \times M_1$ pixels is provided to a Cellular type Neural Network (CNN) of a known type (e.g., "DYNAMICS OF STATE CONTROLLED CNNS", Arena et al., 1996, IEEE). A cellular neural network (CNN), also known as cellular nonlinear network, is an array of cells C(i,j) coupled only with local connections. The cells C(i,j) can be organized in a rectangular grid in which each cell has an input, a status and an output and directly interacts only with the cells within its proximity radius r. In general, the status of each cell C(i,j), and consequently its output, depends only on the input and on the output of the adjacent cells and on the initial status of the network. By varying the values of the connections between the cells C(i,j) (i.e., its interaction weights), a CNN can present a large number of dynamics.

Each pixel of the image with modified scale $R_{I\text{-}B}$ acts as a cell.

For example, the process performed by the cellular neural network is defined by the following mathematical model:

$$C\frac{dx_{ij}(t)}{dt} = -\frac{1}{R_x}x_{ij} + \sum_{c(k,l) \in N_r(i,j)} A(i,j;k,l)y_{kl}(t) + \\ \sum_{c(k,l) \in N_r(i,j)} B(i,j;k,l)u_{kl}(t) + \sum_{c(k,l) \in N_r(i,j)} C(i,j;k,l)x_{kl}(t) + I \quad (1)$$

$$(1 \le i \le M, 1 \le j \le N)$$

$$y_{ij}(t) = \frac{1}{2}(|x_{ij}(t)+1| - |x_{ij}(t)-1|)$$

$$N_r(i,j) = \{C_r(k,l); (\max(|k-i|,|i-j|) \le r, 1 \le k \le M, 1 \le l \le N)\}$$

where:

Nr(i,j) represents the proximity of each cell C(i,j) with radius r.

The magnitudes $x_{ij}$, $y_{ij}$, $u_{ij}$ are respectively the status, the output and the input of the cells C(i,j), I is a coefficient (scalar bias parameter), while A(i,j;k,l), B(i,j;k,l), C(i,j;k,l) are cloning matrices configured to define the process of the cellular network, $x_{ij}(t)$ is the intensity (gray intensity value) of each pixel.

The cloning matrices A(i,j;k,l), B(i,j;k,l), C(i,j;k,l) are 3×3 matrices composed of 9 real coefficients each, where the indices i,j refer to the cell C(i,j) and the indices k,l refer to a respective coefficient of the cloning matrix. In other words, each cloning matrix A(i,j;k,l), B(i,j;k,l), C(i,j;k,l) has 9 coefficients for each cell C(i,j) (i.e., each pixel of the image with modified scale $R_{I\text{-}B}$ is associated with respective and specific coefficients of the cloning matrices A(i,j;k,l), B(i,j;k,l), C(i,j;k,l)). Through a particular set up of the coefficients of the cloning matrices A(i,j;k,l), B(i,j;k,l), C(i,j;k,l), obtained as better described below, a number Z (e.g., around 97) of augmented features are generated. In other words, for each RX image a number Z of augmented images is generated in which each pixel shows the processing resulting from the equation 1 by means of the cloning matrices A(i,j;k,l), B(i,j;k,l), C(i,j;k,l).

Subsequently, the augmented features are supplied to a two-dimensional classifier (block 160) which uses known artificial intelligence processes of the "deep learning" type which, preferably, associates other data of a different nature (e.g., haematochemical data) with the augmented features and provides, for each augmented feature, indication of the percentage of belonging to the first class C1 of images (septic) or to the second class of images C2 (aseptic). In the example of the image of the weld the haematochemical data would not be used.

As is known, deep learning is based on different levels of representation, corresponding to hierarchies of factor or concept features, where the high-level concepts are defined on the basis of the low-level concepts. In other words, deep learning techniques are based on artificial neural networks organized in various layers, where each layer calculates the values for the subsequent layer so that the information is processed in an increasingly complete way.

The two-dimensional classifier that implements the deep learning functions is in fact defined by several mutually interconnected layers that precede a final decider.

In more detail, in block 160, the dimension of the augmented features is reduced from matrix $N_2 \times M_1$ to a vector 1xNx (where 1xNx is the dimension of the vector; substantially, a two-dimensional matrix dimension $N_2 \times M_1$ is modified to a one-dimensional vector 1xNx) before being supplied to the deep learning algorithms. Reduction of the augmented features from matrix to vector is useful as these augmented features can be linked with another vector.

Optionally, in block 160 the augmented features reduced to vector are also associated with a vector of the haematochemical data of 1xNy dimension (where 1xNy is the dimension of the vector) in order to create as a whole a vector of 1x(Nx+Ny) dimensions, which is then supplied to the layers of the 2D Deep Classifier network which provides a two-dimensional output. The vector of the haematochemical data of the patient subjected to radiographic examination (comprising data indicative of the patient's health, for example present in the case notes thereof, such as Haemochrome, LDH, PCR, Fibrinogen), is suitably normalized in the range [0.1] depending on whether the haematochemical data is within or outside the confidence levels.

Finally, in block 160, the two-dimensional classifier provides, for each augmented feature (optionally associated with the haematochemical data), the indication of the percentage of belonging to the first class C1 or to the second class C2). The two-dimensional classifier is of a known type and can, for example, be a ResNet-X or DenseNet-X network. The two-dimensional classifier is trained in a known way through supervised training, on the basis of training images (RX images already classified, for example several thousand images). For example, this takes place iteratively through a loss function of a known type that minimizes the classification error of the training images.

Consequently, in block 160, Z augmented features are produced for each RX image, which are reduced in dimension, associated with the haematochemical data and classified as C1 or C2. Therefore, Z classifications C1 or C2 are generated for each RX image.

A final vote (block 170) selects from the Z classifications a single final classification for the RX image also establishing the percentage of probability of belonging to the class C1 or to the class C2 (for example, through major voting technique or by average of the Z classifications).

For example, the RX image generates 97 augmented features with Sc-CNN which are classified by the 2D Deep Classifier in the following way: 10 features as Septic/87 features as Aseptic. Therefore, the system classifies the RX image as belonging to the Septic class with probability of 10.30% ($^{10}/_{97}$), while it considers it as belonging to the Aseptic class with probability of 89.70% ($^{87}/_{97}$).

Figure 4:
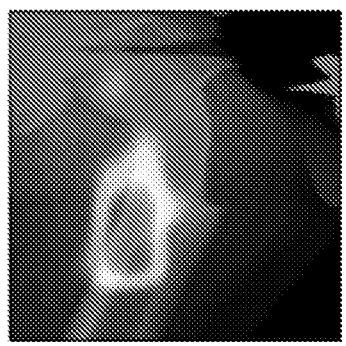
FIG. 4 illustrates a viewing operation performed by the method according to the present invention.
Figure 4:
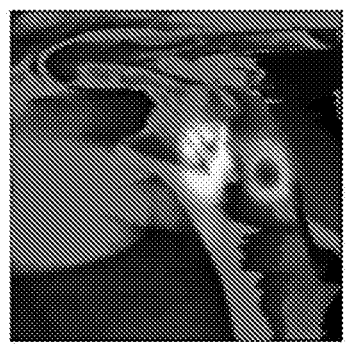
Figure 4:
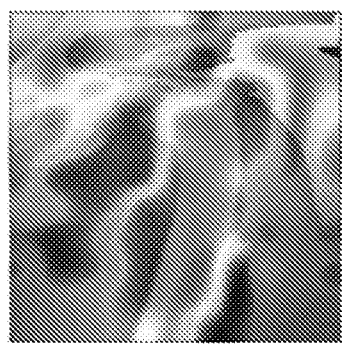
Figure 4:

Operation of the deep learning network can be viewed on the augmented features by means of the GradCAM technique (block 180) which allows a visual representation (FIG. 4) of the operation of the deep learning network utilising visual indications (for example, colours) that illustrate the relative relevance of the augmented features (for example, the most relevant augmented features are associated with the colour red).

The aforesaid operations can be repeated for different radiographic images of the same subject downloaded in subsequent moments, block 190, in order to verify how the percentage of belonging to the first class or to the second class evolves over time. This trend can indicate a prosthesis implantation process or an inflammatory process of the bone associated with the prosthesis.

In the case of radiographic images, these can comprise the image of the weld in subsequent moments in which subsequent fatigue cycles have been performed to verify the resistance of the weld to stresses.

The timing of the diagnosis of infection is crucial for the therapeutic choice, as at different times from onset the biofilm organisation and maturation, and consequently the treatment, change.

In the first 30-45 days from colonisation of the prosthesis the biofilm is considered unstable and therefore susceptible to surgical and therapeutic treatments (antibiotics) which do not require removal of the prosthesis. Beyond this time, biofilm maturation makes any possible medical-surgical treatment that does not involve removal of the prosthesis useless. Therefore, two main stages can be distinguished: a first in which the infection is reversible and a second in which it is irreversible.

Diagnosis is possible in the first stage when the infection is acute (acquired during surgery and caused by highly virulent pathogens, with onset within one month of the surgery) or infection is delayed acute (i.e., generally occurs through a haematogenous route in an implant that has been functioning for some time and is diagnosed within one month of onset of the first symptoms). Instead, when the infection is delayed, acquired during surgery and caused by weakly virulent pathogens, with development of symptoms from 45 days to two years from surgery, or is chronic, we are already in stage two (irreversible without removal).

For this reason the first post-operative clinical follow-up is usually performed 40 days after surgery (to allow prompt diagnosis of an acute infection) and patients are instructed to call the clinic and to have an RX control at the first symptoms of infection, even a long time after surgery (delayed acute). Furthermore, patients undergo yearly intermediate check-ups the first year after surgery and then annually remotely. These follow-up examinations include each time a clinical check-up and an X-ray of the joint operated on.

The process for obtaining the cloning matrices $A(i,j;k,l)$, $B(i,j;k,l)$, $C(i,j;k,l)$ and the coefficient I are now described. The cloning matrices $A(i,j;k,l)$, $B(i,j;k,l)$, $C(i,j;k,l)$ and the coefficient I are learned iteratively by means of a heuristic approach that comprises supervised training of the classification method.

In particular, in a first training cycle (first training iteration) the coefficients of the cloning matrices $A(i,j;k,l)$, $B(i,j;k,l)$, $C(i,j;k,l)$ and the coefficient I are randomly set and, on the basis of these and of training images (i.e., RX images already classified, i.e. with which respective "labels" indicative of the class C1 or of the class C2 of belonging are associated), the actions described in blocks 150-170 are performed to determine respective final classifications (one for each training image). If the final classifications in the first training cycle converge with the respective label (e.g., an accuracy between the final classifications and the label is greater than a threshold accuracy, where the accuracy can be calculated through a loss function of a known type during system validation), the coefficients of the cloning matrices $A(i,j;k,l)$, $B(i,j;k,l)$, $C(i,j;k,l)$ and the coefficient I that resulted in convergence are used in the previously described classification method.

Instead, if convergence is not achieved in the first training cycle, the coefficients of the cloning matrices $A(i,j;k,l)$, $B(i,j;k,l)$, $C(i,j;k,l)$ and the coefficient I are varied in a pseudo-random manner. In particular, the coefficients of the cloning matrices $A(i,j;k,l)$, $B(i,j;k,l)$, $C(i,j;k,l)$ and the coefficient I are varied through a technique based on the use of the bitstream. In particular, for each training cycle (training iteration) subsequent to the first, a bitstream comprised of 4 bits ($b_1 b_2 b_3 b_4$) is generated, where each bit is associated respectively with one of the cloning matrices or with the coefficient I (e.g., $b_1$: $A(i,h;k,l)$, $b_2$: $B(i,h;k,l)$, $b_3$: $C(i,h;k,l)$, $b_4$: I), and each bit is "0" or "1" randomly. The bits that are "1" will correspond to the cloning matrices or coefficient I to be reconfigured while those that are "0" will correspond to the cloning matrices or coefficient I that are not to be reconfigured. Reconfiguration of the coefficients of the cloning matrices and/or of the coefficient I takes place through random updating. For example, the bitstream 1001 indicates the random reconfiguration of the cloning matrix $A(i,h;k,l)$ and of the coefficient I, while the remaining cloning matrices will remain unchanged. At each regeneration of the bitstream and consequently of the cloning matrices and/or of the coefficient I (i.e., at each iteration), the actions described in blocks 150-170 are performed to determine respective final classifications in order to determine the accuracy of the training relating to the training images and to the respective labels. This process is performed iteratively until the convergence according to the prefixed error is reached. Once convergence is obtained, the coefficients of the cloning matrices $A(i,j;k,l)$, $B(i,j;k,l)$, $C(i,j;k,l)$ and the coefficient I that resulted in convergence are used in the previously described classification method.

The algorithm described improves the simplicity of the control stages, as belonging to one class or to the other (and the relative probability of belonging) is determined in an entirely automatic manner.

The invention claimed is:

1. An image classification method, in particular medical images comprising the steps of:
   downloading (100) an image (RX) to be subjected to processing (block 100) and subjecting said image to sampling to create a two-dimensional monochrome grayscale image with L×K pixel dimensions;
   subjecting (block 120) the downloaded image to a segmentation process designed to define, on the entire image, a sub-image $R_1$ which contains a region of interest in which a portion of a patient's limb and a prosthesis inserted in the same limb is visible;
   subjecting (block 130) the sub-image $R_1$ to a classification process designed to define whether the sub-image $R_1$ belongs to a first class of images C1 with a respective first probability P1 or belongs to a second class of images C2 with a respective second probability P2;
   the classification process carries out the following operations:
   performing a feature augmentation step (block 150) wherein each pixel of the sub-image is provided to a Cellular type Neural Network (CNN) formed by an array of cells C(i,j) coupled only with local connections; each cell C(i,j) has an input, a status and an output and directly interacts only with the cells within its proximity radius r; each pixel of the provided sub-image acts as a cell;
   using parameters (A(i,j;k,l), B(i,j;k,l), C(i,j;k,l)) of the model that represents the Cellular type Neural Network (CNN) to generate a number Z of augmented features so that for each RX image a number of augmented images Z is generated in which each pixel shows the processing resulting from the model by means of said parameters (A(i,j;k,l), B(i,j;k,l), C(i,j;k,l)); and
   supplying (block 160) the augmented features to a two-dimensional classifier which uses deep learning artificial intelligence processes, said two-dimensional classifier is configured to provide, for each augmented feature, the indication of the percentage of belonging to the first class of images C1 or to the second class of images C2.

2. The method according to claim 1, wherein the step of subjecting the sampled image to normalization and stabilization algorithms is provided by using filters to eliminate noise, algorithms to improve contrast, algorithms to equalize gray levels.

3. The method according to claim 1, wherein the segmentation process uses the Faster RCNN processing technique which uses convolutional neural networks; the neural network is trained on previous images to determine the sub-image $R_1$.

4. The method according to claim 1, wherein the cellular neural network is defined by the following mathematical model:

$$C\frac{dx_{ij}(t)}{dt} = -\frac{1}{R_x}x_{ij} + \sum_{c(k,l)\in N_r(i,j)} A(i,j;k,l)y_{kl}(t) + \sum_{c(k,l)\in N_r(i,j)} B(i,j;k,l)u_{kl}(t) + \sum_{c(k,l)\in N_r(i,j)} C(i,j;k,l)x_{kl}(t) + I \quad (1)$$

$$(1 \le i \le M, 1 \le j \le N)$$

$$y_{ij}(t) = \frac{1}{2}(|x_{ij}(t)+1| - |x_{ij}(t)-1|)$$

$$N_r(i,j) = \{C_r(k,l); (\max(|k-i|,|i-j|) \le r, 1 \le k \le M, 1 \le l \le N)\}$$

where:
Nr(i,j) represents the proximity of each cell C(i,j) with radius r,
the magnitudes $x_{ij}$, $y_{ij}$ and $u_{ij}$ are respectively
the status, the output and the input of the cells C(i,j), I is a coefficient and A(i,j;k,l), B(i,j;k,l), C(i,j;k,l) are cloning matrices configured to define the process of the cellular network and defining said parameters, $x_{ij}(t)$ is an intensity of each pixel.

5. The method according to claim 4, wherein the cloning matrices A(i,j;k,l), B(i,j;k,l), C(i,j;k,l) and the coefficient I are obtained through supervised training of the Cellular type Neural Network (CNN).

6. The method according to claim 5, wherein said supervised training executed to obtain the cloning matrices A(i,j;k,l), B(i,j;k,l), C(i,j;k,l) and the coefficient I comprises:
   in a first training cycle of the supervised training, randomly setting the coefficients of the cloning matrices A(i,j;k,l), B(i,j;k,l), C(i,j;k,l) and the coefficient I, calculating, on the basis of said randomly set coefficients and of training images, the respective percentages of belonging, and comparing said percentages of belonging with respective classifications of the training images; and
   if convergence of the percentages of belonging with the classifications of the training images is not obtained with the first training cycle, at each subsequent training cycle of the supervised training, randomly setting, by means of bitstream technique, the coefficients of the cloning matrices A(i,j;k,l), B(i,j;k,l), C(i,j;k,l) and the coefficient I, calculating, on the basis of said randomly set coefficients and of further training images, the respective percentages of belonging, and comparing said percentages of belonging with the respective classifications of the training images.

7. The method according to claim 1, wherein the two-dimensional classifier is designed to associate other data indicative of the patient's health with the specific augmented features.

8. The method according to claim 7, wherein said data indicative of the patient's health comprises a vector of the patient's haematochemical data, such as Haemochrome, LDH, PCR, Fibrinogen, and the image is a medical image.

9. The method according to claim 8, wherein the vector of the haematochemical data is normalized in the range [0.1] depending on whether the haematochemical data is within or outside the confidence intervals.

10. The method according to claim 8, wherein said one-dimensional vector with 1xNx dimensions is linked with the vector of haematochemical data with 1xNy dimensions which contains the patient's haematochemical data and the image is a medical image.

11. The method according to claim 1, wherein the augmented features generated by said model are two-dimensional; the method furthermore comprising the step of modifying the dimensions of the augmented features to a one-dimensional vector 1xNx before executing said deep learning artificial intelligence processes.

12. The method according to claim 11, wherein said one-dimensional vector with 1xNx dimensions is linked with the vector of haematochemical data with 1xNy dimen-

13. The method according to claim 1 wherein the step of repeating at least the steps defined in claim 1, for different images downloaded in subsequent moments (block 190) is provided, in order to verify how the percentage of belonging to the first class or to the second class evolves over time.

14. An image classification method for medical images comprising the steps of:

downloading (100) an image (RX) to be subjected to processing (block 100) and subjecting said image to sampling to create a two-dimensional monochrome grayscale image with L×K pixel dimensions;

subjecting (block 120) the downloaded image to a segmentation process designed to define, on the entire image, a sub-image $R_1$ which contains a region of interest;

subjecting (block 130) the sub-image $R_1$ to a classification process designed to define whether the sub-image $R_1$ belongs to a first class of images C1 with a respective first probability P1 or belongs to a second class of images C2 with a respective second probability P2;

the classification process carries out the following operations:

performing a feature augmentation step (block 150) wherein each pixel of the sub-image is provided to a Cellular type Neural Network (CNN) formed by an array of cells C(i,j) coupled only with local connections; each cell C(i,j) has an input, a status and an output and directly interacts only with the cells within its proximity radius r; each pixel of the provided sub-image acts as a cell;

using parameters (A(i,j;k,l), B(i,j;k,l), C(i,j;k,l)) of the model that represents the Cellular type Neural Network (CNN) to generate a number Z of augmented features so that for each RX image a number of augmented images Z is generated in which each pixel shows the processing resulting from the model by means of said parameters (A(i,j;k,l), B(i,j;k,l), C(i,j;k,l)); and supplying (block 160) the augmented features to a two-dimensional classifier which uses deep learning artificial intelligence processes, said two-dimensional classifier is configured to provide, for each augmented feature, the indication of the percentage of belonging to the first class of images C1 or to the second class of images C2.

15. The method according to claim 14, wherein the region of interest comprises a region in which a portion of a patient's limb and a prosthesis inserted in the same limb are visible.

* * * * *